United States Patent
McNair et al.

(10) Patent No.: US 11,537,575 B1
(45) Date of Patent: Dec. 27, 2022

(54) REAL-TIME DATABASE PERFORMANCE TUNING

(71) Applicant: Amazon Technologies, Inc., Seattle, WA (US)

(72) Inventors: Andrew McNair, Vancouver (CA); Jeremiah C. Wilton, Seattle, WA (US); Jerome Pimmel, Vancouver (CA); Bilgehan Sahin, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 689 days.

(21) Appl. No.: 16/266,693

(22) Filed: Feb. 4, 2019

(51) Int. Cl.
| | |
|---|---|
| *G06F 16/21* | (2019.01) |
| *G06F 16/25* | (2019.01) |
| *G06F 11/34* | (2006.01) |
| *H04L 67/563* | (2022.01) |

(52) U.S. Cl.
CPC ........ *G06F 16/217* (2019.01); *G06F 11/3409* (2013.01); *G06F 16/252* (2019.01); *H04L 67/563* (2022.05)

(58) Field of Classification Search
CPC .. G06F 16/217; G06F 16/252; G06F 11/3409; H04L 67/2814
See application file for complete search history.

(56) References Cited

U.S. PATENT DOCUMENTS

| | | | | |
|---|---|---|---|---|
| 5,701,471 A | * | 12/1997 | Subramanyam .... | G06F 11/3428 717/124 |
| 6,549,896 B1 | * | 4/2003 | Candan ............... | G06F 16/9574 |
| 6,604,143 B1 | * | 8/2003 | Nagar ................. | H04L 63/0227 709/229 |
| 6,925,485 B1 | * | 8/2005 | Wang .................. | H04L 67/2847 709/202 |
| 7,680,771 B2 | * | 3/2010 | Cialini .................. | G06F 16/217 707/999.003 |
| 7,849,269 B2 | * | 12/2010 | Sundarrajan ........ | H04L 67/2852 711/139 |
| 8,103,783 B2 | * | 1/2012 | Plamondon ............. | H04L 67/28 709/229 |
| 8,650,266 B2 | * | 2/2014 | Cohen ................ | H04L 67/1095 709/219 |
| 8,701,103 B1 | * | 4/2014 | Hsu ..................... | G06F 11/3696 717/171 |
| 9,135,082 B1 | * | 9/2015 | Sheng ..................... | G06F 11/28 |
| 9,612,921 B2 | * | 4/2017 | Ferguson ............ | G06F 11/1471 |

(Continued)

*Primary Examiner* — Debbie M Le
*Assistant Examiner* — Huen Wong
(74) *Attorney, Agent, or Firm* — Nicholson De Vos Webster & Elliott LLP

(57) ABSTRACT

Techniques are described for enabling real-time database performance measurement and tuning in a service provider network. To efficiently test one or more proposed configuration changes to a database in a service provider network, a database service is able to create a replicated copy of the database in an environment that mirrors that of the primary database. The database service then automatically causes database traffic destined for the primary database to be routed to both the primary database and the test database. Once the test database is created and traffic is routed to both databases, the database service obtains performance data by monitoring performance of both the primary database and the test database over a period of time. Based on the obtained performance database, the database service can automatically determine which of the primary database and the test database is exhibiting better performance.

18 Claims, 9 Drawing Sheets

(56) References Cited

U.S. PATENT DOCUMENTS

| | | | | |
|---|---|---|---|---|
| 10,936,336 B1* | 3/2021 | Willett | G06F 9/44505 |
| 10,958,522 B1* | 3/2021 | Willett | H04L 41/0859 |
| 2001/0000083 A1* | 3/2001 | Crow | G06F 16/9574 |
| | | | | 711/130 |
| 2004/0054777 A1* | 3/2004 | Ackaouy | H04L 67/2852 |
| | | | | 709/225 |
| 2006/0136669 A1* | 6/2006 | Goodman | G06F 12/0815 |
| | | | | 711/118 |
| 2006/0277250 A1* | 12/2006 | Cherry | H04L 67/02 |
| | | | | 709/203 |
| 2008/0209120 A1* | 8/2008 | Almog | H04L 67/2852 |
| | | | | 711/106 |
| 2009/0049054 A1* | 2/2009 | Wong | H04L 67/62 |
| 2010/0198796 A1* | 8/2010 | Beresniewicz | G06F 16/248 |
| | | | | 707/688 |
| 2010/0257513 A1* | 10/2010 | Thirumalai | G06F 16/2365 |
| | | | | 717/134 |
| 2014/0172944 A1* | 6/2014 | Newton | H04L 41/0869 |
| | | | | 709/202 |
| 2014/0201457 A1* | 7/2014 | Sinai | G06F 12/121 |
| | | | | 711/135 |
| 2015/0067171 A1* | 3/2015 | Yum | H04L 67/2809 |
| | | | | 709/226 |
| 2017/0075946 A1* | 3/2017 | Bossa | G06F 16/2471 |
| 2017/0124148 A1* | 5/2017 | Hamilton, II | G06F 1/3234 |
| 2018/0067841 A1* | 3/2018 | Mahimkar | G06F 8/65 |
| 2018/0246945 A1* | 8/2018 | Lee | G06F 11/3433 |
| 2019/0294519 A1* | 9/2019 | Garg | G06F 11/3428 |
| 2019/0327125 A1* | 10/2019 | Mcchord | H04L 12/46 |
| 2020/0125452 A1* | 4/2020 | Kommera | G06F 11/1469 |

* cited by examiner

REAL-TIME DATABASE PERFORMANCE TUNING

BACKGROUND

Databases and the software that supports database operation are among the most complex types of software created to date. In addition to the sophisticated functionality that enables the storage, retrieval, and updating of the data stored in databases, there are typically hundreds or even thousands of database configuration choices that can be made by users. Each of these configuration choices, ranging from choices related to the way in which data is stored in a database to configurations associated with a database engine or underlying computing resources, potentially affects a database's performance with respect to particular workloads. Due in part to this immense complexity, it is often difficult to reliably assess or have confidence about whether any given configuration choice will improve, degrade, or have a negligible impact on a database's performance before the configuration modification is applied.

BRIEF DESCRIPTION OF DRAWINGS

Various embodiments in accordance with the present disclosure will be described with reference to the drawings, in which.

DETAILED DESCRIPTION

Figure 1:
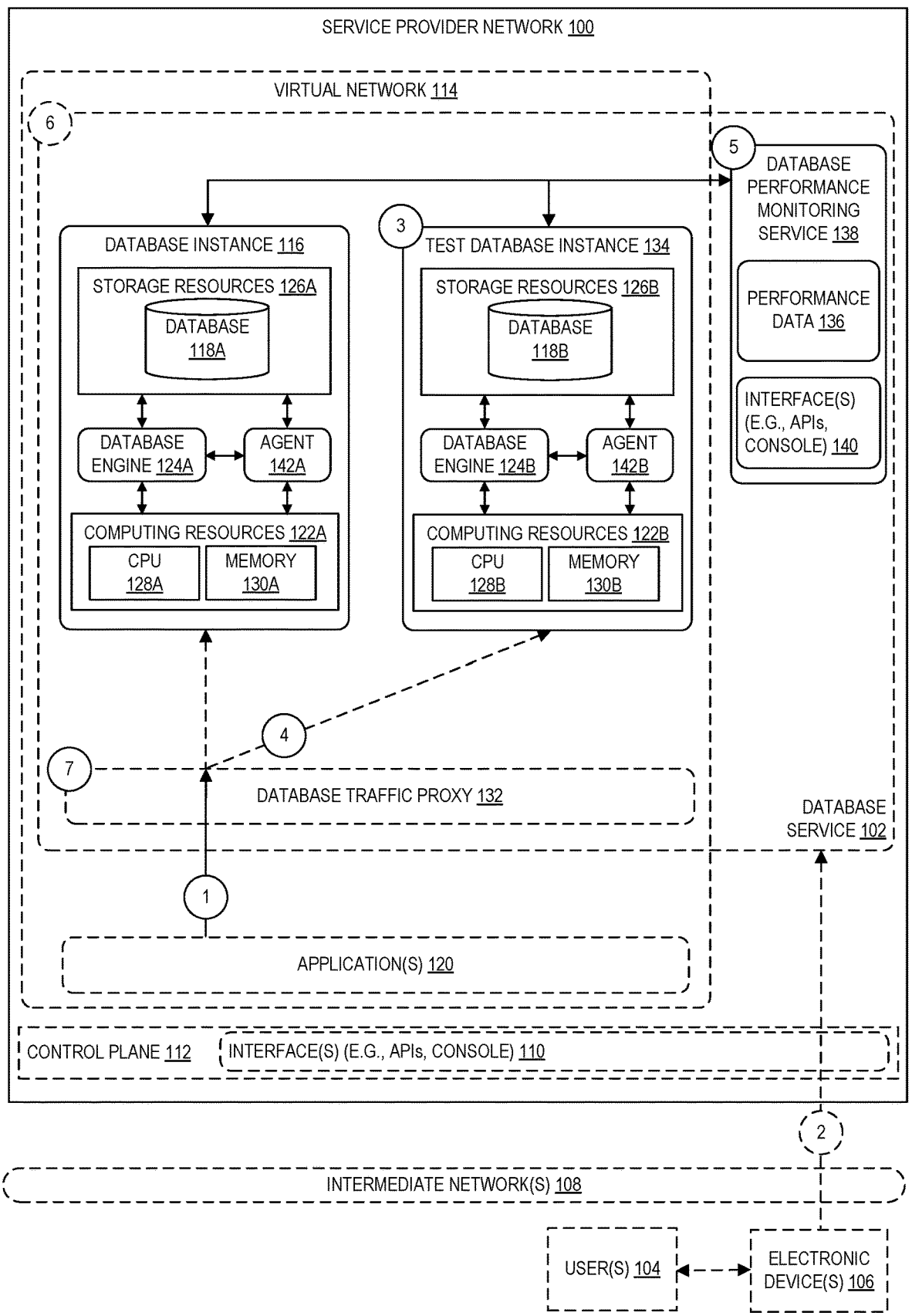
FIG. 1 is a diagram illustrating an environment that enables real-time database performance measurement and tuning in a service provider network according to some embodiments.

Various embodiments of methods, apparatus, systems, and non-transitory computer-readable storage media are described that enable real-time database performance measurement and tuning in a service provider network. Users of the service provider network may, for example, use a database service offered by the provider network to set up, operate, and scale databases used by other user applications or for other purposes. Such users may periodically desire to test and apply configuration changes related to their databases in an effort to improve their databases' performance. The proposed configuration changes, for example, might be identified by a database administrator or other user associated with a database based on the user's experience, identified automatically by the database service and suggested to a user, or from any other source. The proposed configuration changes can relate to the database itself, a database engine through which the database is accessed, an operating system upon which the database engine operates, hardware resources supporting the database and database engine, or any other computing resource that potentially impacts a database's operation.

To test the impact of one or more proposed configuration changes to a database running in a user's production environment, users typically first create a copy of the database at a server located outside of their production environment for testing. For example, a user might manually setup a new server in an isolated testing environment, create a backup of the data stored in the production database, import the backup data to the test database, and attempt to configure the testing environment such that it imitates the production environment. The configuration changes of interest are then applied to the test database and the user can attempt to determine whether the changes improve or degrade the database's performance. The user might, for example, run one or more "synthetic" or test workloads against the test database to test its performance with the proposed configuration changes applied. Such test workloads can include, for example, standardized "off-the-shelf" benchmark workloads, one or more custom workloads created by the user, or a copy of a previously recorded workload that is replayed against the test database.

The database tuning process described above presents several challenges and inefficiencies. As one example, creating a copy of a database for testing in a test environment is time-consuming and setting up a test environment that accurately imitates a production environment is often difficult. Another challenge involves generating test workloads that are similar to those being processed by a production database such that a meaningful performance comparison can be obtained. Furthermore, once it is determined that a configuration change is likely to improve a database's performance, it can be challenging to apply the configuration change in the user's production environment without causing disruptions to ongoing production traffic.

According to embodiments herein, to efficiently test one or more proposed configuration changes to a database in a service provider network, a database service is able to automatically create a replicated copy of the database in an environment that mirrors that of the primary database. The database service then causes database traffic destined for the primary database to be routed to both the primary database and the test database. For example, assuming the primary database is a database presently receiving production database traffic from one or more applications or other sources, the database service configures the user's computing environment at the service provider network such that future database traffic is routed to both the primary database and the test database in real-time. Changes to the primary database are thus mirrored at the test database such that the data stored in the databases remains in sync during testing. Once the test database is created and traffic being is routed to both databases, the database service obtains performance data by monitoring performance of both the primary database and the test database over a period of time. For example, a database performance monitoring service, which may be part of or separate from the database service, collects data indicating how well each of the primary database and the test database (which includes the one or more proposed configuration changes) is performing on the same database workload. This performance data can be presented to users, for example, in the form of visual graphs or other data representations to help users assess the impact of the proposed configuration changes.

In some embodiments, based on the collected performance database, the database service can automatically determine which of the primary database and the test database is exhibiting better performance based on the same database traffic received over the period of time. For example, the performance data may generally indicate the load associated with each of the databases over time, where load represents a number of database sessions that have received work that is pending completion. In this manner, an accurate side-by-side comparison of the databases' performance can be obtained to determine the impact of the proposed configuration changes.

In an embodiment, if the database service determines that the test database exhibits better performance with the proposed configuration changes applied, the database service can automatically configure the user's computing environment such that future database traffic originally destined for the primary database is routed to only the test database, effectively making the test database the new primary database. Because the contents of the test database remain in sync with the primary database during testing, this change can be made with little or no downtime to production traffic. If instead it is determined that the proposed configuration changes either degrade or have a negligible impact on the database's performance, the database service can resume routing traffic to only the primary database and optionally delete the test database. Among other benefits, the processes described above significantly increase the efficiency and accuracy with which database performance tuning can be performed in service provider networks and other computing environments.

FIG. 1 is a block diagram illustrating an environment that enables real-time database performance measurement and tuning in a service provider network. In some embodiments, a database service 102, among any number of other possible services, operate as part of a service provider network 100 and each comprises one or more software modules executed by one or more electronic devices at one or more data centers and geographic locations. User(s) 104 using one or more electronic device(s) 106 (which may be part of or separate from the service provider network 100) can interact with the various services of the service provider network 100 via one or more networks, such as the internet.

A service provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, a database service 102 that can manage databases, and so forth. The users (or "customers") of provider networks 100 may utilize one or more user accounts that are associated with a customer account, though these terms may be used somewhat interchangeably depending upon the context of use. Users may interact with a service provider network 100 across one or more intermediate networks 108 (for example, the internet) via one or more interface(s) 110, such as through use of application programming interface (API) calls, via a console implemented as a website or application, and the like. The interface(s) 110 may be part of, or serve as a front-end to, a control plane 112 of the service provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In some embodiments, computing resources involved in the database tuning processes described herein are provisioned within users' virtual network at the service provider network 100. A virtual network generally enables users to provision logically isolated collections of computing resources (including, for example, computing resources associated with database instances, compute instances, and so forth) at a service provider network 100 and to manage various related capabilities such as security services, firewalls, and intrusion detection systems. A virtual network may in some ways closely resemble a traditional network operated, for example, in a user's own on-premises data center. A virtual network can be logically isolated from other virtual networks associated with a same user account as well as those virtual networks associated with other user accounts of the service provider network.

As shown in FIG. 1, a user has configured a virtual network 114 at the service provider network 100. As indicated above, a virtual network 114 represents a network in which a user of the service provider network can provision a logically isolated set of computing resources. To establish a virtual network 114, a user can allocate one or more computing resources to the virtual network 114 including, for example, a database instance 116. In some embodiments, a virtual network 114 can include any number of other types of resources including compute instances, containers, block storage, network-related resources, and so forth. A range of public IP addresses can also be allocated to the virtual network 114 and one or more networking nodes (for example, routers, switches, and so forth) of the service provider network 100 can be allocated to the virtual network 114. In some embodiments, a virtual network 114 can include one or more of a private gateway and include a public gateway, which enables computing resources within the virtual network 114 to communicate directly with entities via intermediate networks 108, and vice versa, instead of or in addition to via a private communications channel.

In an embodiment, a virtual network 114 can be optionally subdivided into two or more subnetworks, or subnets. For example, in implementations that include both a private gateway and a public gateway, a virtual network 114 can be subdivided into a first subnet that includes resources reachable through the private gateway, and a second subnet that includes resources reachable through the public gateway. In an embodiment, a user can assign allocated public IP addresses to resources in a virtual network 114. A network entity on an intermediate network 108 can then send traffic to a public IP address published by the user; the traffic is routed, by the service provider network 100, to the associated compute instance. Return traffic from the compute instance is routed, by the service provider network 100, back to the network entity over intermediate network 108. Note that routing traffic between a compute instance and the network entity may require network address translation to translate between the public IP address and the local IP address of the compute instance.

In other embodiments, a database for which a user desires to perform the database tuning processes described herein can be provided by a service provider network 100 outside of the context of a virtual network. For example, a user may use a "serverless" database service of the service provider network 100 to provision one or more databases, where a serverless database service enables users to use databases without having to manage the underlying database instances supporting execution of the databases. Using a serverless database service, users can create a database endpoint (for example, managed by a database traffic proxy 132 or similar component), optionally specify a desired database capacity range, and connect their applications to the database endpoint. The serverless database service then automatically provisions and scales database resources based on demand from the user's applications. In these examples, the databases and underlying database instances provided by a serverless database service may not be explicitly associated with a user's virtual network at a service provider network but can still be selected for testing configuration changes, as described herein.

As indicated above, it is desired at times to tune the performance of databases managed by a database service and running in users' virtual networks at a service provider network. Among other benefits, the ability to tune databases in real-time as described herein enables users to have confidence about the impact of proposed configuration changes on their databases. This confidence can be based in part on the fact that a primary database and a replicated copy of the database with one or more configuration changes applied are configured by the database service in an equivalent computing environment and further configured to receive the same workload traffic. Performance data can then be collected for each database thereby providing information indicating what impact the configuration changes would have on the primary database as a whole, on particular queries, or on other aspects of the database's performance. This performance data can thus be used to accurately and confidently determine whether or not it is sensible to apply the configuration changes in the user's production environment.

In an embodiment, at circle "1" in FIG. 1, a database instance 116 supporting a database 118A receives database traffic from one or more applications 120. The applications 120 generally represent any source of database traffic destined for a database 118A. For example, applications 120 can include web-based applications, finance applications, reservation systems, or any other software application that make use of one or more databases. A user can provision a database instance 116A, for example, using a web-based console, API, or other interface of the database service 102, where the database instance is associated with an amount of compute and storage resources that can be specified by a user. Users can further configure various infrastructure-related attributes and control access and security-related parameters for their database instances using various interfaces of the database service 102.

As shown in FIG. 1, a database instance 116A generally comprises computing resources 122A, a database engine 124A, and storage resources 126A. The computing resources 122A, for example, can include CPU 128A, memory 130A, networking, among other possible configurable computing resources used to support execution of the database engine 124A and other components of the instance. The database engine 124A generally represents the software used to interface with a database 118A (for example, to create, read, update, and delete data stored by the database), and can be selected by a user from a set of database engines supported by the database service 102. Examples of possible database engines include, but are not limited to, the Amazon Aurora®, PostgreSQL®, and MySQL® database engines. In an embodiment, a database instance 116 further includes storage resources 126A used to store the data of the database. In various embodiments, a database instance 116, including computing resources 122A, database engine 124A, and storage resources 126A, can be implemented using any combination of physical and virtual computing resources provided by a service provider network 100.

In some embodiments, database traffic destined for a database 118A in a user's virtual network 114 can be received and routed by a database traffic proxy 132. The database traffic proxy 132 can be used, for example, to provide automated scaling of database instance resources, where a number of database instances associated with a database can be scaled based on demand and traffic destined for a database can be balanced across available database instances. In general, the database traffic proxy 132 acts as a database endpoint visible to applications 120 and can route traffic from the applications to appropriate backend database instance(s). As described in more detail hereinafter, the database traffic proxy 132 can also be used to route traffic to a primary database, one or more test database(s), or both, during the performance tuning processes described herein.

In an embodiment, at circle "2," a user 104 optionally generates a request to test one or more configuration changes related to a database instance 116 associated with the user. For example, a user might desire to know whether the one or more proposed configuration changes improve, degrade, or have a negligible impact on the performance of the database 118A optionally associated with the user's virtual network 114. In some embodiments, the request can be generated by a user using a web-based console, API, command line interface (CLI), or any other interface and received and processed by the database service 102. For example, a user can use a web-based console or other interface to identify, among other possible information, a database associated with the user's account and one or more configuration changes associated with the database to be tested.

In other embodiments, a request to test one or more configuration changes can be generated automatically by the database service 102 and without explicit input from a user. For example, a database service 102 can generate a profile of a user's database 118A, determine one or more proposed configuration changes based on the generated profile, and generate a notification for the user suggesting one or more proposed configuration changes to be tested. The database service 102, for example, can generate one or more notifications displayed in a web-based console, or otherwise send one or more notification messages to a user associated with the database 118A identifying proposed configuration changes to be tested. In some examples, the automatic generation of configuration change suggestions can be performed in response to user input consenting to the database service 102 profiling the user's databases to make such suggestions.

As indicated above, for the database service 102 to make automatic configuration change suggestions for a database in some embodiments, a profile of a database 118A can be generated by the database service 102. The profile, for example, can include information indicating a type of database, a structure or other attributes of the database, a type and version of database engine, a type and amount of available computing resources, a type of workload/queries being processed by the database, and the like. Once a database profile is generated, the profile can be compared by the database service 102 against knowledge bases, or other algorithms can be applied based on the profile data to generate recommendations. In some examples, machine learning approaches can be used to generate models based on performance data collected from other databases managed by the database service 102. A machine learning model, for example, can be generated in part by labeling different types of workloads processed by databases, labeling different types of workloads/queries that are processed by the databases (for example, queries using anti joins, hash joins, single table queries, and so forth), among other possible aspects of the databases' operation. Based on these and possibly other types of data, algorithms can be generated to indicate, for example, that for particular type of databases and particular workload/query patterns, particular configuration changes are known to typically improve database performance.

In other embodiments, a database service can proactively test one or more configuration changes without directly suggesting the changes and involving the user in the testing process. For example, assuming that a user has provided consent for the database service to proactively test proposed configuration changes, a database service can perform performance testing as described below without suggesting the proposed configuration changes to a user (for example, by automatically launching a test database with the proposed configuration changes, forking database traffic to both the primary database and test database, analyzing performance of both database, and automatically determining which database exhibits better performance). Once the database service 102 identifies a configuration change that is a good candidate for a particular database based on such testing, the database service 102 can then suggest to the user that the proposed configuration changes be applied to their database.

Figure 2:
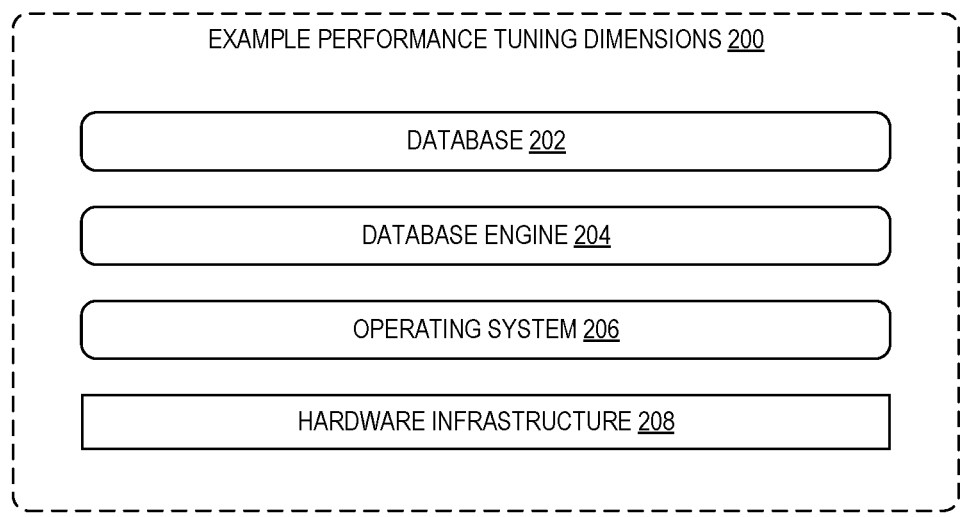
FIG. 2 is a diagram illustrating example dimensions upon which databases can be tuned according to some embodiments.

In an embodiment, the identified configuration changes to be tested (identified based on either user input or automatic identification by the database service 102) can relate to any aspect of a computing environment that potentially impacts performance of a database 118A. FIG. 2 is a diagram illustrating example dimensions upon which databases can be tuned and to which configuration changes may apply. As illustrated in FIG. 2, example performance tuning dimensions 200 can include, but are not limited to, the database 202 itself (for example, parameters for one or more indexes, types of indexes, statistics associated with particular tables, and so forth), the database engine 204 that manages operation of the database 202, an operating system 206 supporting execution of the database engine 204, and the hardware infrastructure 208 supporting execution of the foregoing components.

In some embodiments, users can test switching from one type of database engine to another, where one database engine may support different types of queries or query syntax from the other database engine. In this example, a database traffic proxy 132 or other component of the database service 102 can be configured to rewrite queries for different types of database engines as the queries are received so that different types of database engines can be tested in real-time.

In an embodiment, at circle "3," in response to identifying the proposed configuration changes, the database service 102 creates a second database instance 134 including a test database 116B that is a replicated copy of the database 118A. For example, the database service 102 can automatically create a snapshot of the database 118A running at the database instance 116, launch a new test database instance 134 with the same type of database engine 124B, same amount of storage resources 126B, same amount of computing resources 122B (including CPU 128B and memory 130B resources) as the database instance 116 (unless the proposed configuration changes include changes to any of these resource types or configurations, in which case the resources can differ between the instances), and restore the copy of the database 118A at the test database instance 134. Although the example of FIG. 1 shows the test database 118B running on an entirely separate test database instance 134, in some embodiments, the primary database 118A and test database 118B may share at least some of the same computing or storage resources.

The process of creating the test database 118B further includes the database service 102 applying the one or more configuration changes to be tested, for example, by applying the configuration changes to the test database 118B, the database engine 124B, the storage resources 126B or compute resources 122B, or to any other aspect of the operating environment supporting database 118B. In this manner, the database 118B running at the test database instance 134 mirrors the database 118A running at database instance 116 with the exception of the configuration changes to be tested being applied to the test database 118B or its computing environment.

In an embodiment, at circle "4," database traffic that is destined for the primary database 118A is routed to both the primary database 118A and the test database 118B. In one embodiment, the database service 102 changes configuration at a database traffic proxy 132 so that traffic destined for the primary data is routed to both databases, effectively forking traffic that would have otherwise been received by only the primary database 118A. As indicated above, because the database traffic proxy 132 acts as a database endpoint for applications 120, the forking of the database traffic can be performed transparently to the applications 120 sending the database traffic.

In other embodiments, the database service 102 modifies configuration of the primary database 118A such that database traffic received by the primary database is also routed to the secondary database. For example, an agent 142A or other component associated with the primary database 118A may create a copy of all database traffic that it receives and forward the copy of the database traffic to the secondary database. In another embodiment, the primary database 118A generates an audit log of database traffic that it receives and either sends the audit log or database traffic regenerated from the audit log to the test database instance 134 so that the traffic can be replayed at the test database 118B. In an embodiment, the mirrored database traffic or audit logs can be replayed at the test database instance 134 by the agent 142B or another component associated with the test database instance 134. The agent 142B, for example, can analyze the received mirrored traffic or audit logs and attempt to replay the database traffic in a manner that is as similar to how the traffic was processed by the primary database 118A, including accounting for concurrency issues related to the primary database concurrently receiving traffic from any number of separate connections.

Figure 3:
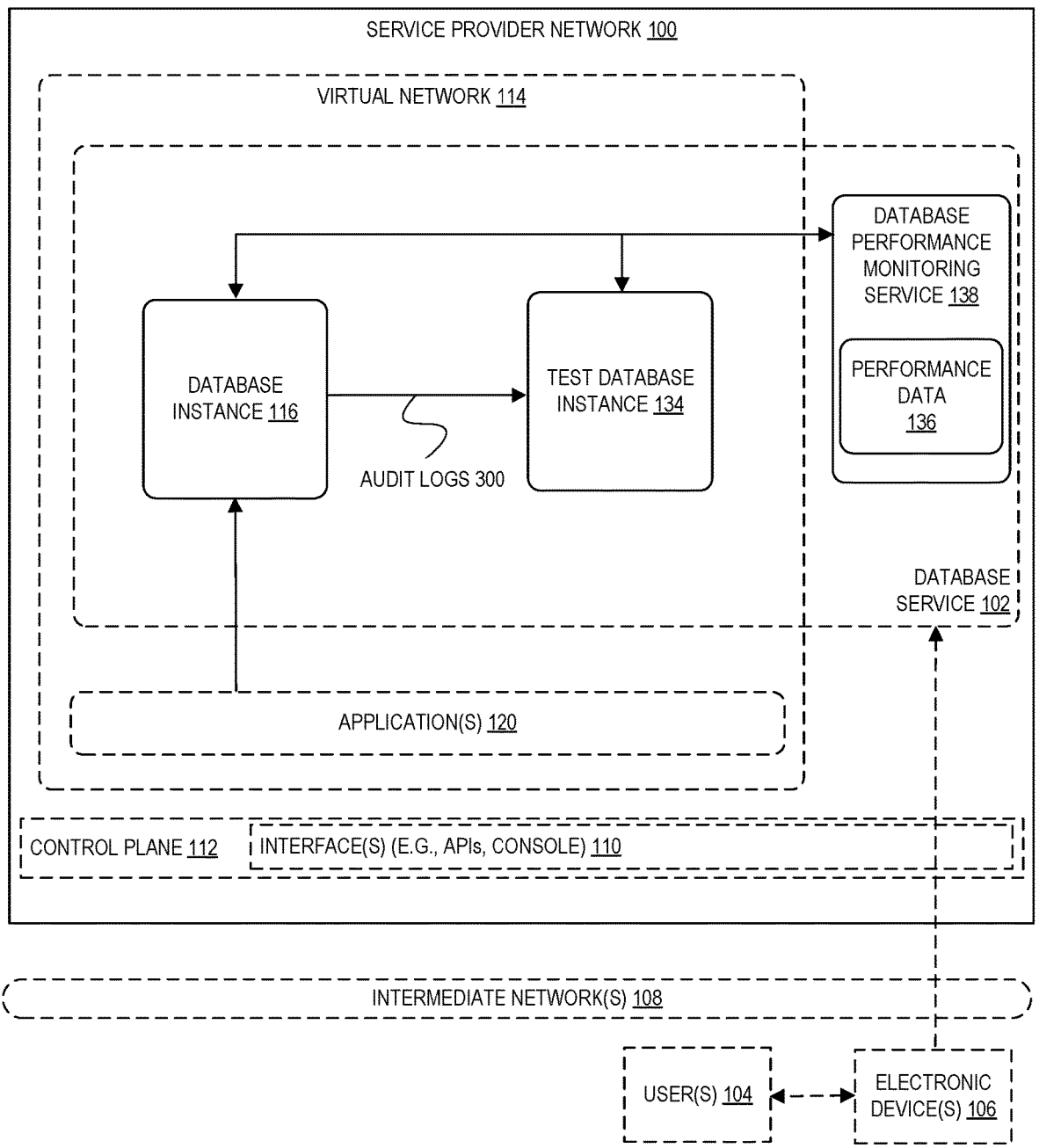
FIG. 3 is a diagram illustrating an example alternative process for routing database traffic destined for a primary database to both the primary database and a test database according to some embodiments.

FIG. 3 is a diagram illustrating an example alternative process for routing database traffic destined for a primary database to both the primary database and a test database according to some embodiments. As illustrated in FIG. 3, database traffic generated by an application 120 is received initially by a database instance 116. In an embodiment, the database instance 116 generates audit logs 300 or other data reflecting the database traffic received by the instance, and sends the audit logs 300 (or data derived from audit logs) to the test database instance 134. The test database instance 134 can then use the audit logs 300 to replay the same traffic against the test database hosted by the test database instance 134 so that the database instance 116 and test database instance 134 operate on the same workload.

Figure 4:
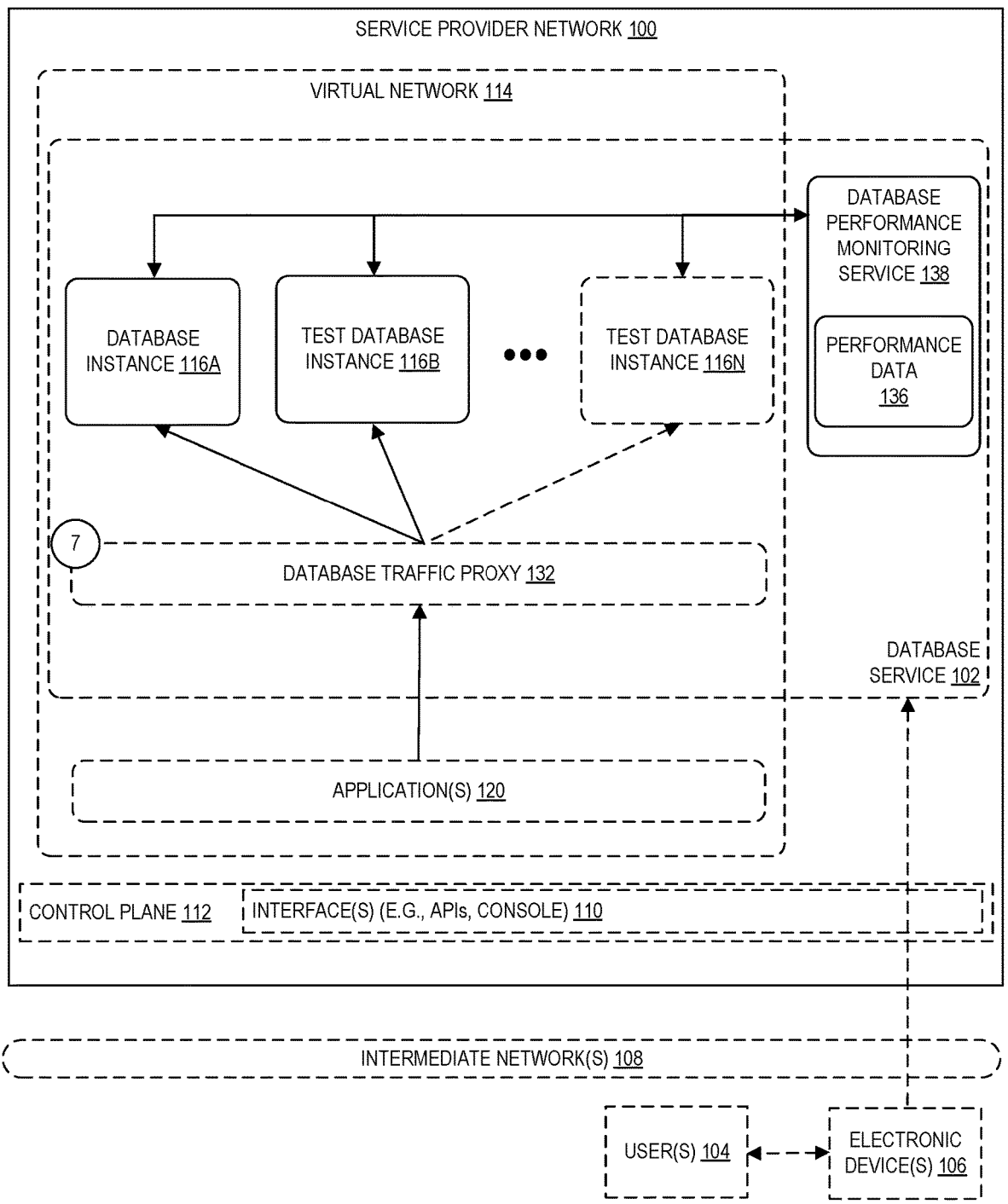
FIG. 4 is a diagram illustrating the creation of a plurality of test databases used to perform real-time database performance tuning of multiple configuration choices according to some embodiments.

Although FIG. 1 illustrates the creation of a single test database to test one or more configuration changes, in some examples, multiple test databases can be created to test multiple separate configuration changes or permutations of configuration changes. For example, if a user identifies multiple configuration changes to test or a range of configuration parameters to test, a separate test database can be created for each separate configuration option, or separate test databases can be created for various permutations of the identified parameters. FIG. 4 is a diagram illustrating the creation of a plurality of test databases used to perform real-time database performance tuning according to some embodiments. As shown in FIG. 4, in response to identifying two or more configuration changes to test, a database service 102 can generate two or more test database instances 116B-116N, where each instance can be configured with one of the possible configuration choices or configuration choice permutations. Similar to FIG. 1, a database traffic proxy 132 can then be configured to route traffic originally destined for a primary database instance 116A to both the primary database instance and to each of the plurality of test database instances 116B-116N. As illustrated in these examples, a user can thus test multiple different configuration changes to a database setting (for example, test changing a setting X to either configuration value Y or value Z) and run various permutations of settings and setting configurations in parallel. In some embodiments, a user can provide further input indicating an amount of time and resources that the user is willing to spend to perform such testing and the database service 102 can determine an amount of testing that can be performed using the allotted resources.

In an embodiment, at circle "5," performance data 136 is obtained by monitoring performance of both the primary database 118A and the test database 118B over a period of time as the databases each process the same workload received from application(s) 120. The performance data 136, for example, generally represents time series data measuring how efficiently each database processes the workloads. In an embodiment, a performance monitoring service 138, which may be part of or separate from the database service 102, collects the performance data from the database instances via agents running on the database instances or using other performance data collection techniques.

In an embodiment, a performance monitoring service 138 generally enables the collection of performance data 136 related to databases running at a service provider network 100 as described above, and further provides various interfaces that enables users to assess their databases' performance and to help analyze any issues that may arise. For example, the performance monitoring service 138 may enable users to access web-based dashboards and other interfaces that allow users to visualize their databases' load over time and to filter the load by waits, SQL statements, hosts, or users, among other features. In an embodiment, users and other system components interact with a database performance monitoring service 138 via one or more interface(s) 140, such as through use of application programming interface (API) calls, via a console implemented as a website or application, or other types of interfaces.

In one embodiment, a metric measured by a performance monitoring service 138 and derived from the collected performance data 136 is database load, which represents the average number of active sessions for a database engine over time. An active session is a connection that has submitted work (for example, by an application 120) to a database engine and is waiting for a response. For example, if an application 120 submits a SQL query to a database engine 124A, the associated database session is active while the database engine 124A is processing that query. To process any given request from an application 120, a database engine typically performs a number of processes such as, for example, parsing the SQL statement, generating an execution plan, executing a generated plan, possibly using various indices to carry out the plan, and so forth.

In an embodiment, a database performance monitoring service 138 can obtain performance measurements by requesting the measurements from an agent (for example, agents 142A, 142B) running at database instances hosting one or more databases (for example, once every second), and the agent responds back with a list of connections at each database that are current processing one or more requests and other information related to the load at the database instance. In other examples, the database instances periodically send the performance measurements to the database performance monitoring service 138 without receiving requests from the service. The list returned by a database instance can further include identifiers of instances or applications initiating each active request, connection identifiers, and types of operations being performed (for example, whether an I/O operation is being performed, the database is waiting for a lock, and so forth). Thus, the performance monitoring service 138 can break down, for each point in time displayed in a graph, how many connections are waiting on each type of operation. Thus, to compare the performance of two or more databases, the respective load values for the databases over time can be compared to see which database more efficiently is processing a respective workload. An agent running on a database instance can obtain performance metrics for a database by requesting the information from and/or monitoring the database itself, an associated database engine, an operating system or other software running on the database instance, system resources associated with the database instance, or any combinations thereof.

Figure 5:
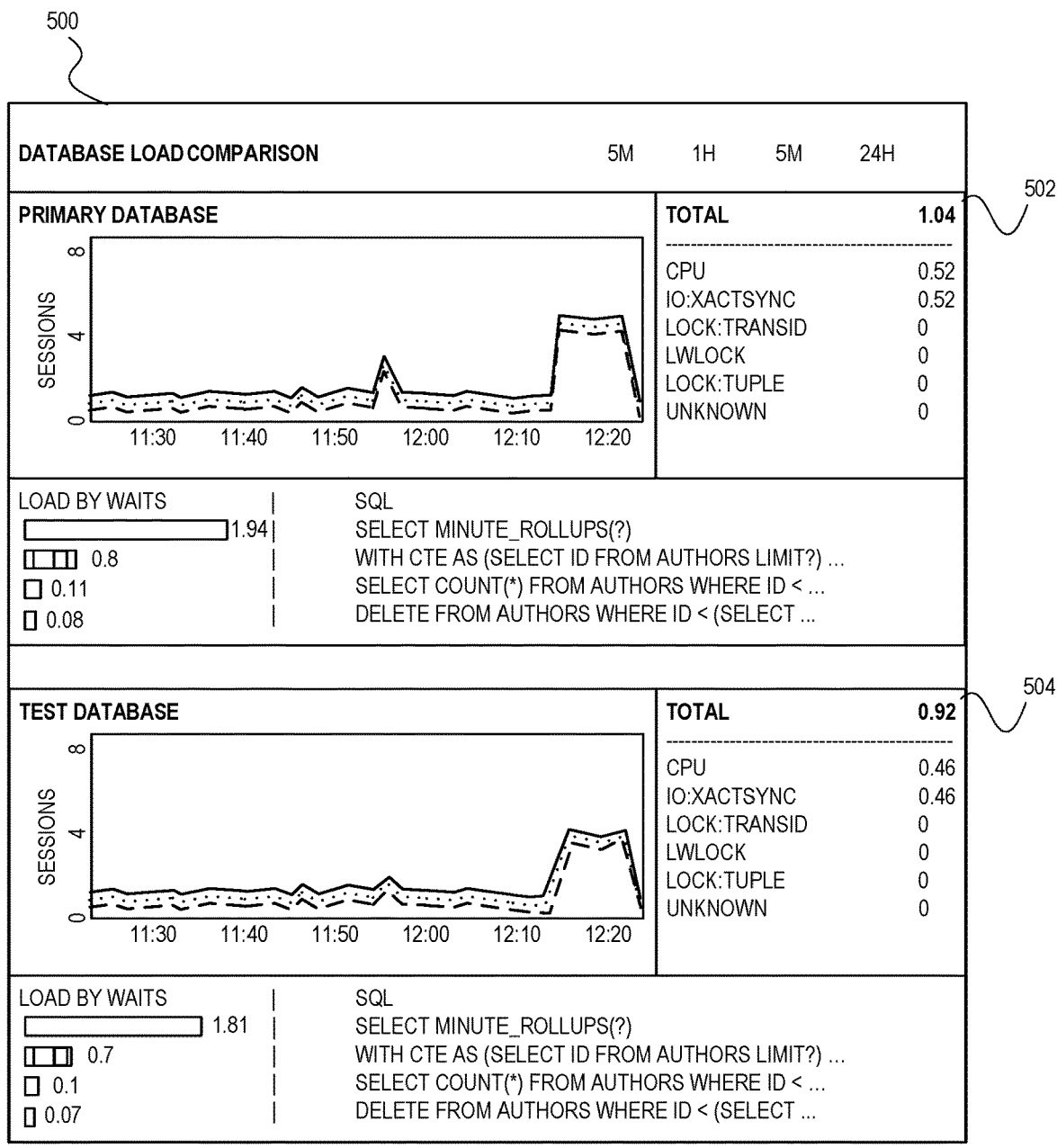
FIG. 5 illustrates an example interface used to compare performance of a primary database and a test database executing a same workload according to some embodiments.

As indicated above, in some embodiments, a database performance monitoring service 138 enables users to view graphical user interface (GUIs) displaying information about their databases performance. FIG. 5 illustrates an example interface 500 used to compare performance of a primary database and a test database according to some embodiments. As shown in FIG. 5, a first interface panel 502 may display information about the performance of a primary database in terms of load over a user-selected period of time. As further shown in panel 502, the load experienced by the primary database can be broken down in various ways, including based on specific queries and how much time elapsed to process each type of query. As further shown in FIG. 5, a second panel 504 can be displayed in a same interface illustrating the performance of a test database. In this manner, a user can readily obtain a side-by-side performance comparison of a primary database and one or more test databases with proposed configuration changes applied to determine whether the configuration changes improve, degrade, or have a negligible impact on the database's performance.

Returning to FIG. 1, at circle "6," the database service 102 optionally determines whether the primary database or the test database exhibits better performance based on the collected performance data 136. For example, the database service 102 can analyze the obtained performance data 136 to determine whether the primary database 118A or the test database 118B is exhibiting better performance based on the same workload traffic in terms of the measured database load or other performance metrics.

In one embodiment, assuming that the database service 102 automatically determined that the proposed configuration change(s) improve performance of a user's database, the database service 102 can generate a notification suggesting that the configuration change be applied, as described above. For example, the database service 102 can generate a notification message in a web-based console or via another interface suggesting that the user consider applying the proposed configuration change to the user's production environment. The notification can be accompanied with a graphical display or other representation of the performance data that the service collected and used to determine that the proposed configuration change indeed improves the database's performance.

In some embodiments, a user can specify one or more metrics of interest and/or other conditions for use in determining whether one database is performing better than another. For example, a user may provide input to the database service 102 indicating that the user considers a database to better performing if the measured database load is at least 10% less than another database over a specified period of time, or if a database executes one or more specified queries at least 5% faster, and so forth. In some examples, the database service 102 may suggest one or more performance criteria to a user for selection to help users decide when a database is better performing (for example, the database service 102 can ask the user whether the user desires to optimize for load generally, CPU usage, memory usage, performance of common queries, and so forth).

In an embodiment, at circle "7," database traffic originally destined for the primary database is routed to only the better performing database. For example, assuming that it is determined that the test database instance 134 including the proposed configuration changes exhibits improved performance, the database service 102 can configure the database traffic proxy 132 to send traffic to only the test database instance 134, effectively making the test database 118B the new primary database. In some embodiments, the switch from the original primary database 118A to the test database 118B can be implemented as a failover from the primary database to the test database in a manner that minimizes any disruption to ongoing database traffic. In some embodiments, once one of the primary database or test database is no longer being used because it was determined to exhibit lesser performance, the lesser performing database optionally can be deleted.

As indicated above, in some cases, a database service 102 can automatically cause database traffic originally destined for a primary database to be routed to only the better performing database. It may not always be possible however for such a change to be performed automatically by the database service 102 and without user involvement. For example, the database service 102 may be determine that the data stored in the primary database and the data stored in the secondary database are out of sync because of the way in which the workload was replayed on the secondary database or due to other factors, and thus an automatic change could cause data consistency issues. In other examples, it may be determined that an automatic failover to a test database instance cannot be performed because the configuration change requires a system restart or because the databases are currently receiving too much traffic for the failover to be performed safely. In an embodiment, part of the performance data 136 collected by the database performance monitoring service 138 can include a metric indicating instances of differences between the data stored in a primary database and a test database (for example, by detecting transaction errors that occur at one database but not the other(s)) so that the database service 102 and associated users can determine whether such inconsistencies may be present.

In an embodiment, in cases where a database service 102 determines that a failover to a better performing secondary database cannot be performed automatically, the database service 102 can generate a notification to the user suggesting that the user perform the failover manually. The database service 102 may guide the user in performing any steps involved in manually directing traffic to the better performing database including, for example, possibly helping the user replicate the primary database and apply the relevant configuration changes at a new database instance, causing a database traffic proxy 132 to route traffic accordingly, among other possible processes.

Figure 6:
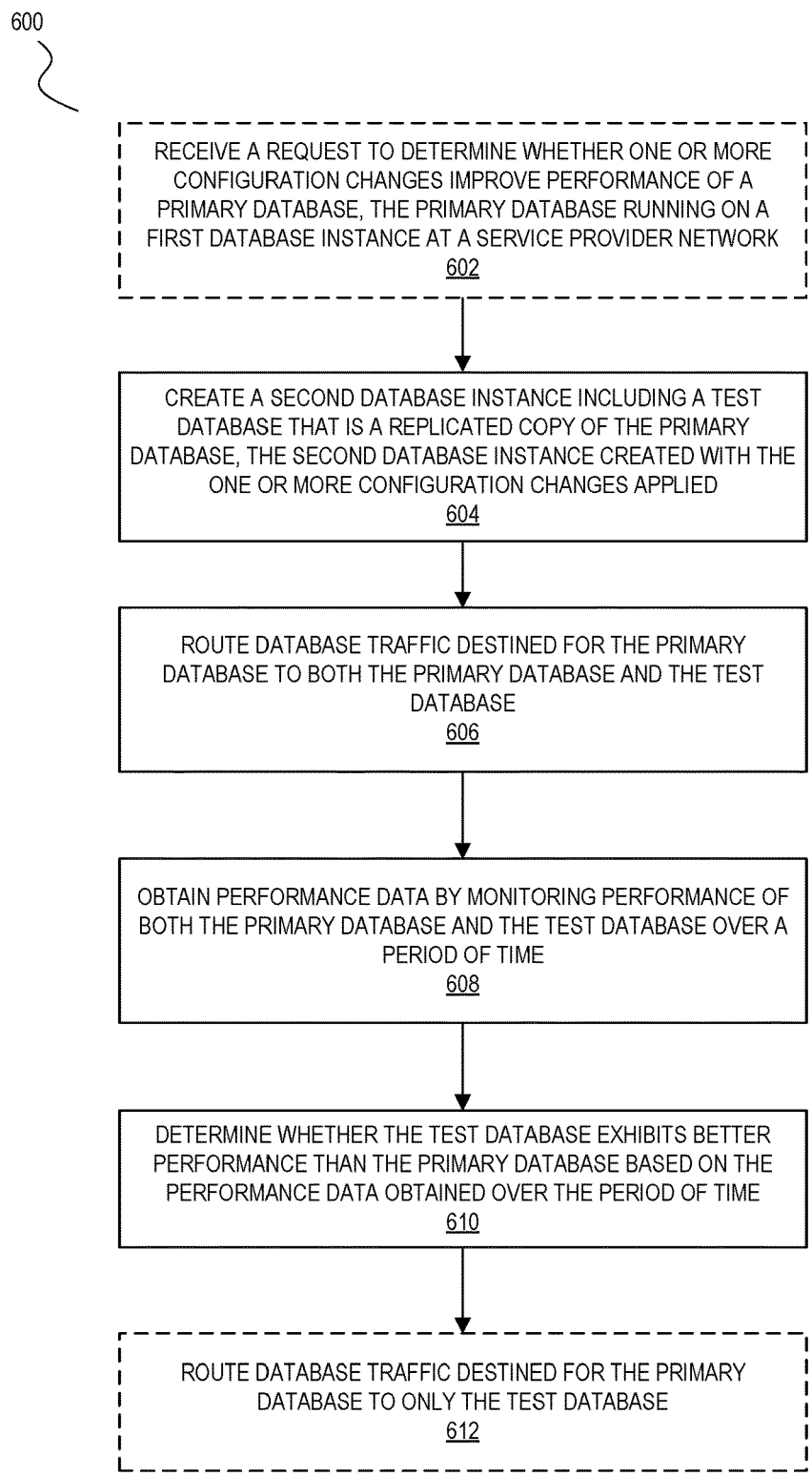
FIG. 6 is a flow diagram illustrating operations of a method for enabling real-time database performance tuning in a service provider network according to some embodiments.

FIG. 6 is a flow diagram illustrating operations 600 of a method for enabling real-time database performance measurement and tuning in a service provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a database service 102, database instances, and database performance monitoring service 138 of the other figures.

The operations 600 include, at block 602, optionally receiving a request to determine whether one or more configuration changes improve performance of a primary database, the primary database running on a first database instance at a service provider network. Referring to FIG. 1, for example, a database service 102 may receive the request from a user 104 of the service provider network 100 associated with a primary database 118A. In one embodiment, the one or more configuration changes relate to one or more of: the primary database, a database engine, compute resources upon which the database engine executes, storage resources used by the primary database, and an operating system associated with the first database instance.

In an embodiment, a database service of a service provider network identifies the one or more configuration changes based on a profile of the primary database, the profile identifying one or more of: a type of the primary database, a version of the primary database, attributes of the primary database, a type of the database engine, a version of the database engine, an amount of computing resources available to the first database instance, a type of workload processed by the primary database, and types of queries processed by the primary database.

The operations 600 include, at block 604, creating a second database instance including a test database that is a replicated copy of the primary database, the second database instance created with the one or more configuration changes applied. For example, as illustrated in FIG. 1, a database service 102 can create a test database instance 134 including a test database 118B. In an embodiment, the second database instance is created by a database service of a service provider network by: creating a snapshot of the primary database; launching the second database instance; and creating the test database based on the snapshot of the primary database. In an embodiment, the database service 102 creates a plurality of a second database instances to test a plurality of configuration changes related to the primary database, wherein each second database instance of the plurality of second database instances is configured to test a respective configuration change of the plurality of configuration changes.

The operations 600 include, at block 606, routing database traffic destined for the primary database to both the primary database and the test database. In one embodiment, the database traffic is routed by a database traffic proxy that provides a database endpoint for the primary database and the secondary database, wherein a database service of the service provider network configures the database traffic proxy to route the database traffic to both the primary database and the test database. For example, a database service 102 can configure a database traffic proxy 132 to route database traffic received from applications 120 to both a database instance 116 and a test database instance 134. In an embodiment, routing the database traffic destined for the primary database to both the primary database and the test database includes causing the primary database to send log data to the test database, and wherein the database traffic is replayed at the test database data based on the log data.

The operations 600 include, at block 608, obtaining performance data by monitoring performance of both the primary database and the test database. In an embodiment, the performance data includes time series data measuring database load over time, and wherein the measured database load is filterable by one or more: database operation type, Structured Query Language (SQL) query, host, and user. For example, a user can choose a particular SQL query that is executed frequently and compare performance of the SQL query at the primary database and the secondary database, or the user can compare performance associated with particular types of database operation types (for example, whether a database is waiting on CPU resources, a database lock, or other type of operation), or requests originating form particular hosts or users. In an embodiment, the database service causes display of a graphical user interface (GUI) including graphs comparing performance of the primary database and the test database The operations 600 include, at block 610, determining whether the test database exhibits better performance than the primary database based on the performance data obtained over the period of time. For example, a database service 102 can determine whether a database 118A or database 118B exhibits better performance based on performance data 136 collected by a database performance monitoring service 138.

The operations 600 include, at block 612, routing database traffic destined for the primary database to only the test database. For example, in response to determining that a test database 118B exhibits better performance than a primary database 118A, a database service 102 can configure a database traffic proxy 132 to route traffic only the test database 118B, effectively making the test database 118B the new primary database.

Figure 7:
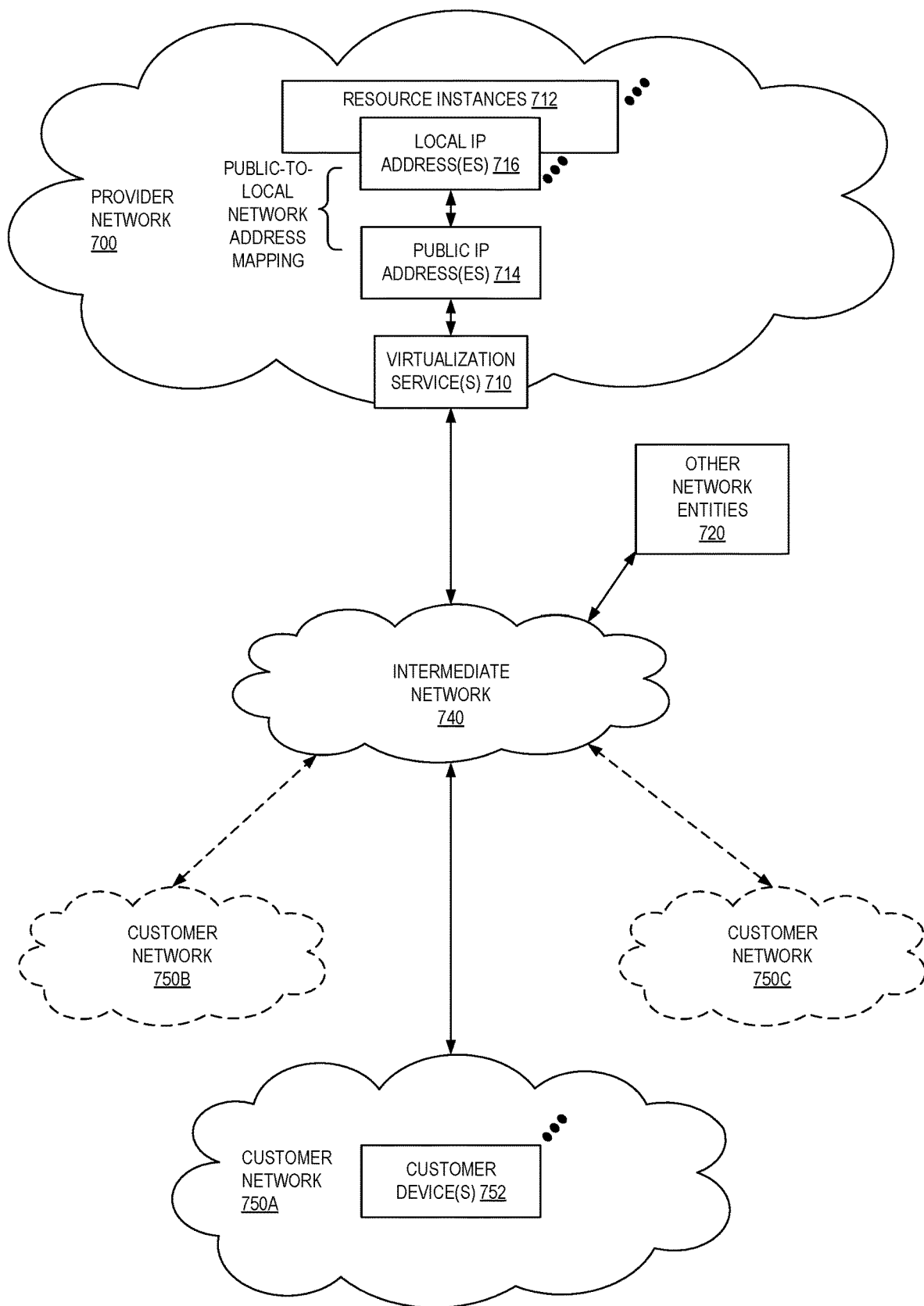
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
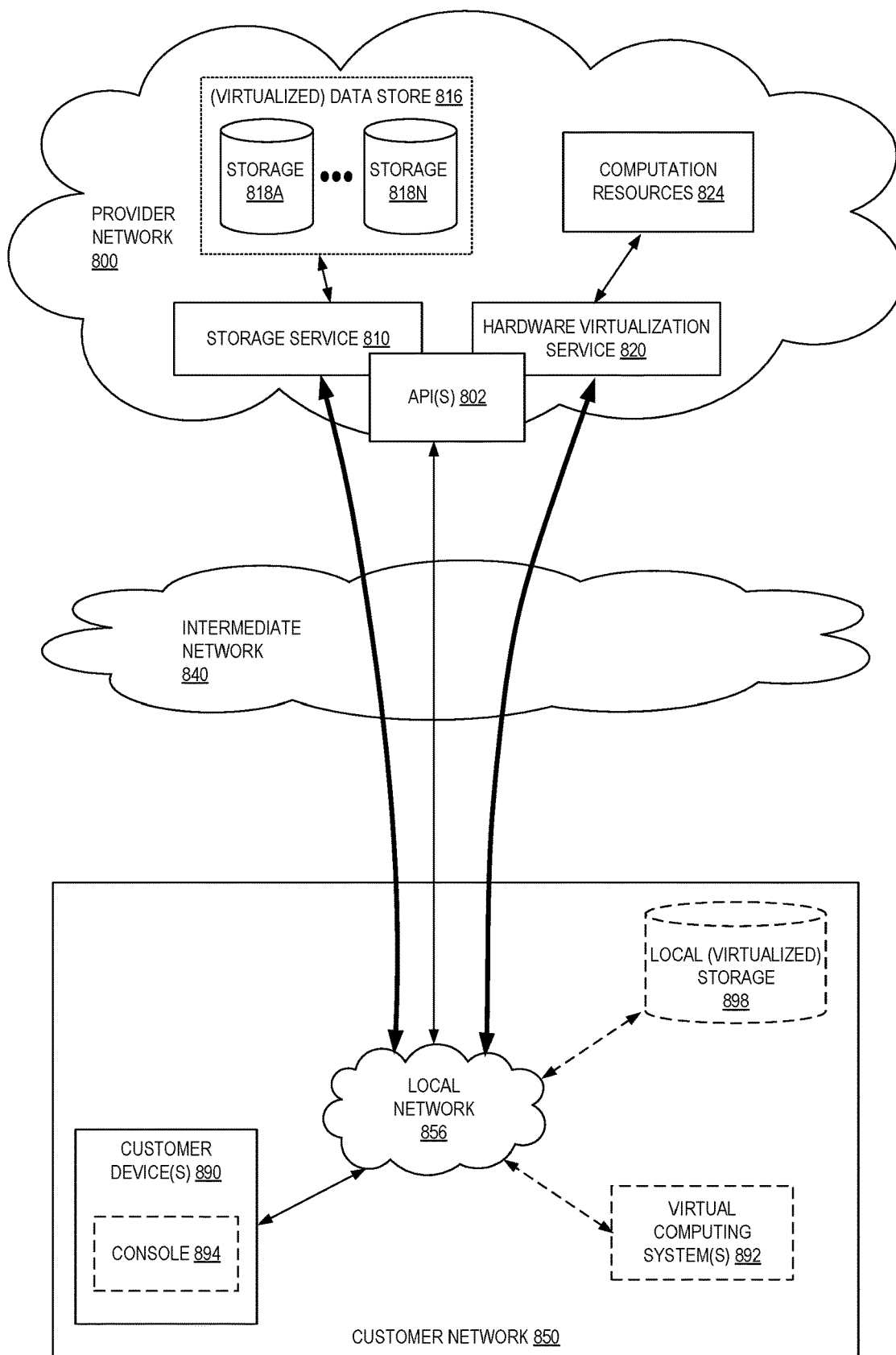
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
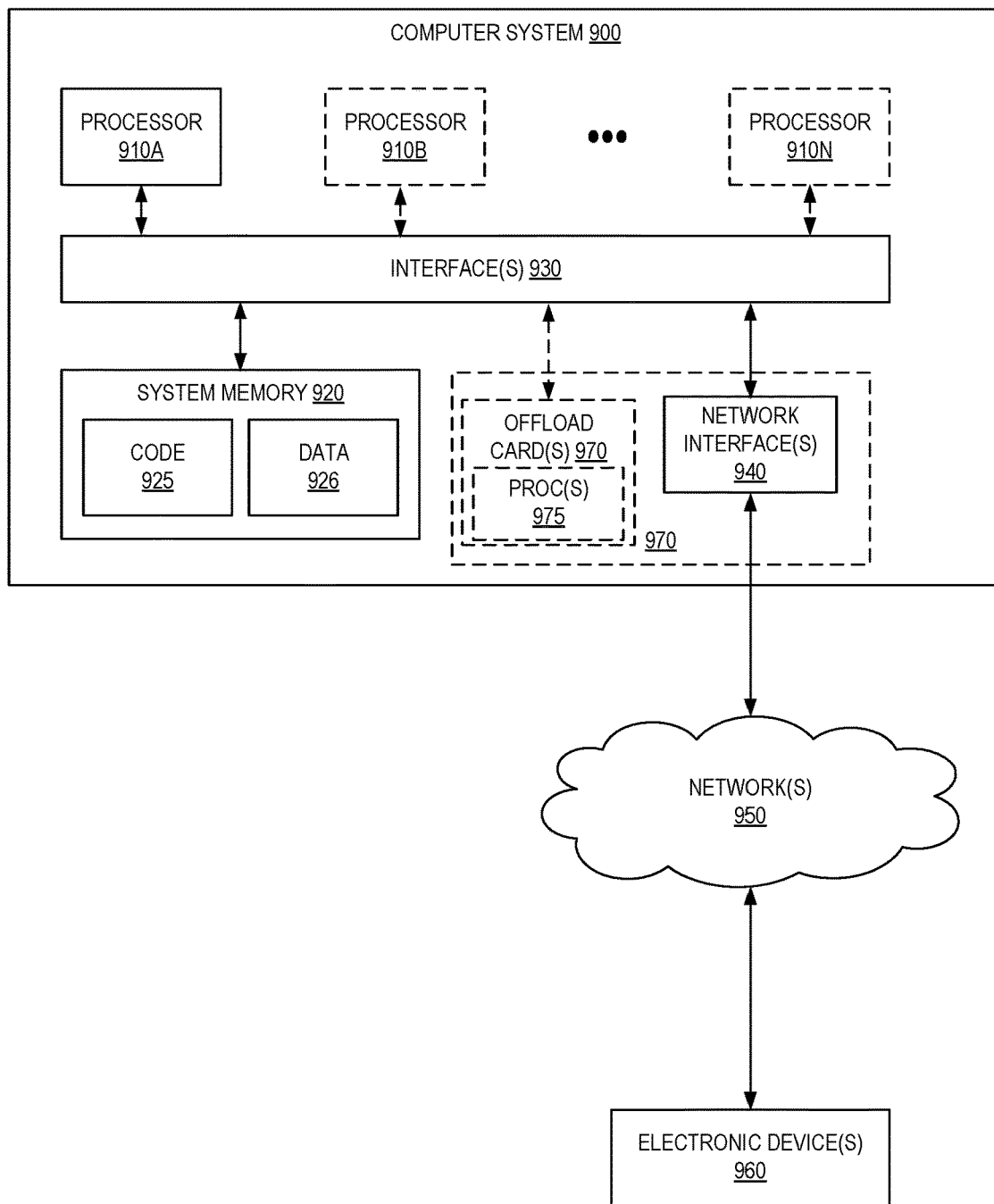
FIG. 9 is a block diagram illustrating an example computer system that may be used in some embodiments.

In some embodiments, a system that implements a portion or all of the techniques for enabling real-time performance measurement and tuning of databases in a service provider network as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a request to determine whether one or more configuration changes improve performance of a primary database, the primary database running on a first database instance at a service provider network, the first database instance comprising a database engine, compute resources, and storage resources supporting operation of the primary database;
    testing, by a database service provided by a cloud provider, performance of a second database instance with the one or more configuration changes applied by:
        creating the second database instance including a test database that is a replicated copy of the primary database, the second database instance created with the one or more configuration changes applied, and
        sending instructions to a database traffic proxy to change a configuration at the database traffic proxy to route database traffic destined for the primary database to both the primary database and the test database, wherein the database traffic proxy serves as a database endpoint for one or more database applications that send database traffic to the database endpoint,
        routing, by the database traffic proxy, database traffic, sent by one or more database applications to the database endpoint and received by the database traffic proxy and destined for the primary database, to both the primary database and the test database, and
        wherein routing the database traffic to both the primary database and the test database is based on the database traffic proxy forking the database traffic to both the primary database and the test database so that the database traffic, which otherwise would have been routed only to the primary database, is routed to both the primary database and the test database;
    obtaining performance data by monitoring performance of both the primary database and the test database over a period of time;
    determining that the test database exhibits better performance than the primary database based on the performance data obtained over the period of time; and
    routing, by the database traffic proxy, database traffic destined for the primary database to only the test database, wherein the test database serves as a new primary database.

2. The computer-implemented method of claim 1, wherein the one or more configuration changes relate to one or more of the primary database, the database engine, the compute resources, the storage resources, and an operating system associated with the first database instance.

3. A computer-implemented method comprising:
    identifying one or more configuration changes related to a primary database to be tested for performance purposes, the primary database running on a first database instance;
    testing, by a database service provided by a cloud provider, performance of a second database instance with the one or more configuration changes applied by:
        creating the second database instance including a test database that is a replicated copy of the primary database, the second database instance created with the one or more configuration changes applied, and
        sending instructions to a database traffic proxy to change a configuration at the database traffic proxy to route database traffic destined for the primary database to both the primary database and the test database, wherein the database traffic proxy serves as a database endpoint for one or more database applications that send database traffic to the database endpoint,
        routing, by the database traffic proxy, database traffic, sent by one or more database applications to the database endpoint and received by the database traffic proxy and destined for the primary database, to both the primary database and the test database, and
        wherein routing the database traffic to both the primary database and the test database is based on the database traffic proxy forking the database traffic to both the primary database and the test database so that the database traffic, which otherwise would have been routed only to the primary database, is routed to both the primary database and the test database;
    determining that the test database exhibits better performance than the primary database based on performance data collected for both the primary database and the test database; and
    routing, by the database traffic proxy, database traffic destined for the primary database to only the test database, wherein the test database serves as a new primary database.

4. The computer-implemented method of claim 3, wherein the first database instance comprises a database engine, compute resources, and storage resources supporting operation of the primary database, and wherein the one or more configuration changes relate to one or more of the primary database, the database engine, the compute resources, the storage resources, and an operating system associated with the first database instance.

5. The computer-implemented method of claim 3, wherein the first database instance is running at a service provider network, and wherein the database traffic is routed by the database traffic proxy that provides a database endpoint for the primary database and the test database.

6. The computer-implemented method of claim 3, wherein the one or more configuration changes are received in a request from a user of a service provider network associated with the primary database.

7. The computer-implemented method of claim 3, wherein a database service of a service provider network identifies the one or more configuration changes based on a profile of the primary database, the profile identifying one or more of a type of the primary database, a version of the primary database, attributes of the primary database, a type of database engine supporting operation of the primary database, a version of the database engine, an amount of computing resources available to the first database instance, a type of workload processed by the primary database, and types of queries processed by the primary database.

8. The computer-implemented method of claim 3, wherein the second database instance is created by a database service of a service provider network by:
creating a snapshot of the primary database;
launching the second database instance; and
creating the test database based on the snapshot of the primary database.

9. The computer-implemented method of claim 3, wherein the performance data includes time series data measuring database load over time, and wherein the measured database load is filterable by one or more of database operation type, Structured Query Language (SQL) query, host, and user.

10. The computer-implemented method of claim 3, wherein the performance data reflects execution of a same workload by both the primary database and the test database over a period of time.

11. The computer-implemented method of claim 3, wherein the database traffic is routed by a database traffic proxy running at a service provider network, and wherein a database service of the service provider network configures the database traffic proxy to route the database traffic to both the primary database and the test database.

12. The computer-implemented method of claim 3, further comprising causing display of a graphical user interface (GUI) including graphs comparing performance of the primary database and the test database.

13. The computer-implemented method of claim 3, further comprising creating a plurality of second database instances to test a plurality of configuration changes related to the primary database, wherein each second database instance of the plurality of second database instances is configured to test a respective configuration change of the plurality of configuration changes.

14. A system comprising:
a database service implemented by a first one or more electronic devices, the database service including instructions that upon execution cause the database service to:
identify one or more configuration changes related to a primary database to be tested for performance purposes, the primary database running on a first database instance;
test, by the database service, performance of a second database instance with the one or more configuration changes applied by:
creating the second database instance including a test database that is a replicated copy of the primary database, the second database instance created with one or more configuration changes applied, and
sending first instructions to a database traffic proxy to change a configuration at the database traffic proxy to route database traffic destined for the primary database to both the primary database and the test database;
determine that the test database exhibits better performance than the primary database based on performance data collected for both the primary database and the test database; and
send second instructions to the database traffic proxy to change a configuration at the database traffic proxy to route database traffic destined for the primary database to only the test database, wherein the test database serves as a new primary database;
the database traffic proxy implemented by a second one or more electronic devices of a service provider network, the database traffic proxy serving as a database endpoint for one or more database applications that send database traffic to the database endpoint, the database traffic proxy including instructions that upon execution cause the database traffic proxy to:
receive first instructions to route database traffic, sent by one or more database applications to the database endpoint and received by the database traffic proxy and destined for the primary database, to both the primary database and the test database;
route the database traffic to both the primary database and the test database;
wherein the instructions that upon execution cause the database traffic proxy to route the database traffic to both the primary database and the test database comprise instructions that upon execution cause the database traffic proxy to fork the database traffic to both the primary database and the test database so that the database traffic, which otherwise would have been routed only to the primary database, is routed to both the primary database and the test database;
receive second instructions to route database traffic destined for the primary database to only the test database; and
route the database traffic to only the test database.

15. The system of claim 14, wherein the first database instance comprises a database engine, compute resources, and storage resources supporting operation of the primary database, and wherein the one or more configuration changes relate to one or more of the primary database, the database engine, the compute resources, the storage resources, and an operating system associated with the first database instance.

16. The system of claim 14, wherein a database service of a service provider network identifies the one or more configuration changes based on a profile of the primary database, the profile identifying one or more of a type of the primary database, a version of the primary database, attributes of the primary database, a type of database engine supporting operation of the primary database, a version of the database engine, an amount of computing resources available to the first database instance, a type of workload processed by the primary database, and types of queries processed by the primary database.

17. The system of claim 14, wherein the performance data includes time series data measuring an average number of active sessions of the primary database and the test database over a period of time.

18. The system of claim 14, wherein the performance data reflects execution of a same workload by both the primary database and the test database over a period of time.

* * * * *